United States Patent
McGrath

(10) Patent No.: US 6,419,998 B1
(45) Date of Patent: Jul. 16, 2002

(54) METHOD FOR DEPOSITION OF METAL CATALYSTS ON INERT SUPPORTS

(76) Inventor: Thomas McGrath, 23 S. Blvd., Apt. 10, Richmond, VA (US) 23220

(*) Notice: Subject to any disclaimer, the term of this patent is extended or adjusted under 35 U.S.C. 154(b) by 0 days.

(21) Appl. No.: 09/597,470

(22) Filed: Jun. 19, 2000

(51) Int. Cl.$^7$ .................. C23C 14/30; C23C 14/14; C23C 14/00

(52) U.S. Cl. ............... 427/596; 427/597; 427/523; 427/531

(58) Field of Search ............... 427/457, 523, 427/531, 528, 581, 595, 596, 597

(56) References Cited

U.S. PATENT DOCUMENTS

| | | | |
|---|---|---|---|
| T988,007 I4 | 11/1979 | Drew et al. | 427/53.1 |
| 4,668,647 A | 5/1987 | Rice et al. | 502/5 |
| 4,970,397 A | 11/1990 | Green et al. | 250/341 |
| 4,971,853 A | 11/1990 | Chaiken et al. | 428/172 |
| 5,037,785 A | 8/1991 | Wilson et al. | 502/5 |
| 5,059,449 A | 10/1991 | van der Putten et al. | 427/53.1 |
| 5,260,108 A * | 11/1993 | Braren et al. | 427/581 |
| 5,405,656 A * | 4/1995 | Ishikawa et al. | 427/500 |
| 5,447,910 A * | 9/1995 | Hayashi et al. | 505/474 |
| 5,683,601 A | 11/1997 | Tatah | 219/121.85 |
| 5,726,095 A * | 3/1998 | Noble | 438/454 |
| 6,060,127 A * | 5/2000 | Tatah et al. | 427/458 |
| 6,146,714 A * | 11/2000 | Beyer et al. | 427/554 |
| 6,177,151 B1 * | 1/2001 | Chrisey et al. | 427/596 |

OTHER PUBLICATIONS

Chriset, Douglas B. and Hubler, Graham K., Pulsed Laser Deposition of Thin Films, John Wiley & Sons, Inc., New York, NY 1994, pp. 117–119.*

Kurita et al., Size Reduction of Gold Particles in Aqueous Solution By Pulsed Laser Irradiation, Applied Physics Letters, vol. 72, No. 7, pp. 789–791, Feb. 16, 1998.

Takami et al., Size Reduction of Silver Particles in Aqueous Solution by Laser Irradiation, Journal of Applied Phys., vol. 35 (1996) pp. L781–L783.

Prochazka et al., Laser Ablation: Preparation of "Chemically Pure" Ag Colloids For Surfact–Enhanced Raman Scattering Spectroscopy, Journal of Molecular Structure, 410–411 (1997) 213–216.

Prochazka et al., Probing Applications of Laser–Ablated Ag Colloids in SERS Spectroscopy: Improvement of Ablation Procedure and SERS Spectral Testing, Anal. Chem. 1997, 69, 5103–5108.

Neddersen et al., Laser Ablation of Metals: A New Method for Preparing SERS Active Colloids, Applied Spectroscopy, vol. 47, No. 12, 1993.

McGrath et al., Laser–Induced "Regeneration" of Colloidal Particles: The Effects of Thermal Inertia on the Chemical Reactivity of Laser–Heated Particles, Angew, Chem. Int. Ed. 1999, 38, No. 22.

Bosbach et al., Laser–based Method for Fabricating Monodisperse Metallic Nanoparticles, Applied Physics Letter, vol. 74, No. 18, May 3, 1999, pp. 2605–2607.

Poondi et al., Synthesis of Silver Nanoparticles by a Laser–Liquid–Solid Interaction Technique, Journal of Materials Synthesis and Processing, vol. 6, No. 2, 1998. pp. 89–102.

Willhohl et al., Production and Characterization of Highly Dispersed Catalytic Active Platinum and Palladium Powders by Excimer Laser Photoysis, J. Phys. Chem. 1994, 98, pp. 2242–2247.

* cited by examiner

Primary Examiner—Bret Chen
Assistant Examiner—Eric B Fuller
(74) Attorney, Agent, or Firm—John H. Thomas, PC

(57) ABSTRACT

The present invention provides a method for depositing a catalyst onto a substrate through the use of pulsed laser radiation. A solution is prepared containing the catalyst and the support. The beam from a pulsed laser whose wavelength is such that it is absorbed by the catalyst is directed into the liquid. The laser reduces the catalyst particle size and allows it to be deposited as a film or as small diameter particles onto the support thereby giving a catalyst with enhanced activity.

15 Claims, 2 Drawing Sheets

METHOD FOR DEPOSITION OF METAL CATALYSTS ON INERT SUPPORTS

FIELD OF THE INVENTION

The field of the invention relates to a method of preparing catalyst particles and then depositing those particles onto an inert support, and to the products of that method.

BACKGROUND OF THE INVENTION

Catalysts are used in a variety of industrial chemical processes to speed the approach of a chemical reaction to equilibrium. In the reaction, a true catalyst is not consumed as one of the reactants in the reaction; its role is to facilitate the progress of the reaction. As such, the catalyst is used over and over again in a chemical reaction. In order for the catalyst to be used in a manner where it is available to the reactants in a continuous chemical process, the catalyst is generally supported on an inert substrate that acts primarily as a mechanical support. The reactants in a chemical process are exposed to the catalyst at temperature and pressure conditions that are favorable for the reaction to proceed, and the products are extracted. Often, the reactants flow over a bed of the supported catalyst in a reactor and the products are formed continuously, flowing out of the reactor.

Many of the chemical compounds that are used for catalysts are expensive precious metals. Commonly used industrial catalysts include silver, platinum, palladium, rhodium, cobalt, iron, and nickel and oxides thereof. Other transition metals, transition metal oxides, mixed metal oxides, and lanthanide metals and oxides may also be used. The scale of chemical reactions carried out in modern industry is often large, requiring large quantities of expensive catalytic compounds. Because of the high cost of catalysts, and the general goal of making chemical reactors efficient, it is generally desirable to make catalysts as efficient as possible. For instance, colloidal forms of metals by themselves can act as catalysts, but are of little value in any commercial process since recovery of the catalyst is a problem. Catalysts are therefore usually supported on materials of large surface area and porosity known as catalyst supports. Efficiency of catalytic activity typically requires a large surface area and demands uniformity of the catalyst on the support.

Examples of the industrial use of catalysts include the reaction of hydrogen with sulfur compounds found naturally in crude oil to form hydrogen sulfide. In this case, platinum and cobalt-molybdenum catalysts are used to enhance the rate of reaction between the hydrogen and the sulfur containing compounds found in the oil so that the reaction takes place at an acceptable rate. The hydrogen sulfide is separated from the oil leaving the oil with a reduced sulfur content. The catalyst remains in the reactor so that it can be used over again in the reaction.

In general, the activity of a catalyst depends on the surface area of the catalyst since the reactants must come together in the presence of the catalyst before a reaction can take place. For a given mass of a specific catalyst, the most efficient form of the catalyst is where it has the largest surface area, so its surface is accessible to the reactants. Thus in the preparation of catalysts, it is desirable to deposit the catalyst on a solid support so that it has a maximal surface area.

It is recognized in the prior act that there are two important methods of chemical synthesis of catalysts on a support. The first, termed the precipitation method, involves mixing two or more solutions or suspensions of material resulting in precipitation of the catalyst. Following reaction the resulting material is washed, filtered, dried, and heated. In the second method, known as the impregnation method, the support is contacted with a solution of one or more metallic compounds. The support is then dried and the catalyst is activated chemically or physically. Typically this involves heating in a reductive atmosphere or heating to induce decomposition calcination. As an example, platinum chloride can be adsorbed on dry, particulate aluminum oxide. On heating in a hydrogen atmosphere, the platinum chloride decomposes leaving metallic platinum particles on the aluminum oxide. The platinum on the aluminum oxide support may then be used as a catalyst in a reactor.

In some cases, the activities of a catalyst may be further enhanced by the addition of small amounts of a catalyst promoter. For example, in the production of ethylene oxide, silver loaded on an alumina support is used as the catalyst. Small amounts of rubidium or cesium are also added to promote the reaction.

Such purely chemical methods of preparing catalysts on supports give only indirect or marginal control of the particle size distribution (the mean diameters of the particles and the standard deviation in the diameter) of the catalyst particles on the support. Further problems with purely chemical methods include control of the uniformity of distribution of the catalyst on the support.

In addition to the purely chemical methods noted above, there are also known methods for preparing catalysts with the use of lasers. A problem with some known laser teachings is that they only include a metal catalyst as a target in solution. There is no inert support or any other substrate present for the catalyst to attach to or be deposited on. Other references teach absorption of the laser energy by the substrate and not a metal catalyst.

SUMMARY OF THE INVENTION

It is an object of the invention to overcome the foregoing drawbacks and provide a method for modifying the size of catalyst particles on a support and/or controlling the size of catalyst particles deposited on a support through absorption of intense pulsed laser radiation. It is also an object of the invention to provide a means of catalyst synthesis, and depositing catalyst on a support as a film, or as particles, using as starting materials bulk metal, metallic compounds, colloidal particles, previously synthesized catalyst on a support, and/or support materials.

The invention uses a pulsed laser beam that is absorbed by catalyst particles. The effect of absorption of the laser radiation is to convert a portion of the mass of the particles into aqueous ions. The ions recombine on the surface of a substrate (or support) as small particles, a film, or small agglomerations of atoms. The unaffected particles in suspension can also deposit on the substrate. The laser interacts more strongly with larger particles than it does with the smaller ones. This is the case whether the particles are in suspension or on the substrate. Thus, large particles in suspension or on the substrate are converted into ions in solution that can form new, small particles, films, or agglomerations of atoms on the surface of the substrate. The ejection of ions from the irradiated particles also leads to a size reduction of the larger particles. The process of conversion to ions, chemical reduction, and deposition on the surface can take place over and over again. The magnitude of the interaction depends not only on the specific particle being irradiated and on the particle diameter, but also on the laser intensity. Thus a method is provided for depositing catalyst particles on a support, controlling the size of catalyst particles, and controlling the distribution of particle sizes on a support.

The deposition of particles on a support is accomplished by irradiating a catalyst suspension, a precursor catalyst compound, or a bulk catalyst. The invention uses a laser to produce a catalyst on a support. The invention provides a means for making smaller and more uniform particles than is commonly produced by chemical methods thereby making the catalyst more efficient. After the irradiation process is complete, the catalyst may be dried and it may be activated by reduction or oxidation methods to obtain the desired active state of the catalyst particles.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF THE INVENTION

There are four alternative embodiments of the invention detailed here. The first employs a colloidal suspension of a metal, metal oxide, or mixed metal oxide catalyst that is mixed with particles of a substrate or catalyst support. The suspension is then irradiated by a laser. A second mode of employing the same apparatus uses a catalyst already deposited on a support which is then irradiated by a laser. In the second embodiment of the invention, the laser irradiates a bulk metal catalyst target in the presence of support particles, which results in the production of ions of the metal which eventually end up as metal bonded to the support as colloidal particles in solution. In the third embodiment, a pump and reservoir have been added to facilitate production of large quantities of catalyst on a support. The pump circulates the mixture of catalyst and support as the laser fires. The chemical action is identical to that described in the first embodiment of the device except that the suspension is circulated. Both modes of operation are possible. In the fourth embodiment of the invention, a pump and reservoir have been added to a cell where bulk metal catalyst is irradiated in the presence of a suspension of the support. The purpose of the addition of the pump and reservoir is to permit large quantities of the supported catalyst to be produced.

In each of the forgoing embodiments, after the irradiation process is complete, the catalyst may be dried and it may be activated by well known reduction or oxidation methods to obtain the desired active state of the catalyst particles. Any type of catalyst may be used in connection with the present invention. Catalysts include, but are not limited to, silver, platinum, palladium, rhodium, cobalt, iron, and nickel and oxides thereof. Other catalysts used may include transition metal oxides, mixed metal oxides, lanthanide metals and oxides thereof and other transition metals not listed here. How the catalyst is dried or activated is up to the person who is determining the desired end catalytic properties. Catalyst promoters may also be added. The methods for promoting, drying and activation are known to one of skill in the art.

Figure 1:
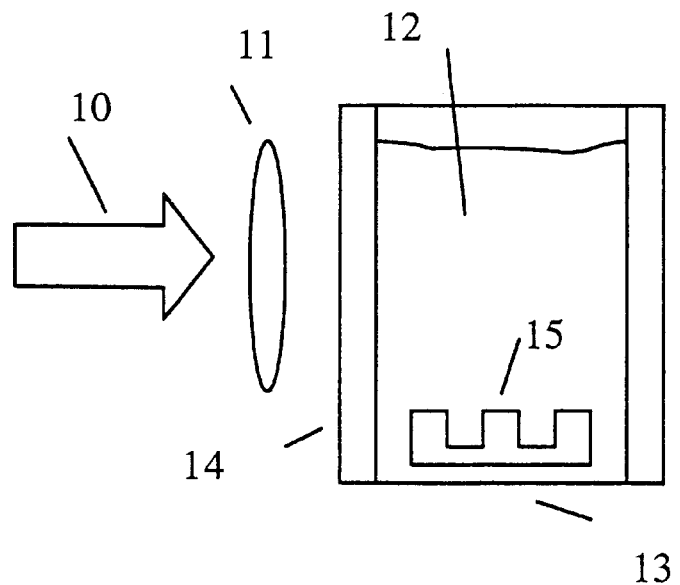
FIGS. 1 to 4 are schematic diagrams of different apparatuses that represent different embodiments of the present invention.

In the first embodiment of the invention schematically shown in FIG. 1, a laser beam irradiates a solution of a colloid of the catalyst material in nanopure water to which has been added particles of a catalyst support material such as titanium oxide, aluminum oxide, or a zeolite. The suspension of colloidal metal, metal oxide or mixed metal oxides and support particles is made by mixing the powdered support particles together with the colloidal catalyst, which has been synthesized using well-known chemical methods. This mixture can be rapidly stirred, or placed in an ultrasonic bath for a few minutes to facilitate good mixing and the break up of any agglomerated particles. The concentration of the colloidal suspension must be controlled such that the laser beam is able to transverse the full width of the container. If the colloidal suspension is too optically thick, the irradiation process will only take place at the container-suspension interface.

Specifically, FIG. 1 shows a laser beam (10) focused by a high power lens (11) directed to irradiate a solution of nanopure water (12) containing a colloid of the catalyst material together with particles of the support. In this embodiment of the invention, a volume of the metal catalyst/support suspension is irradiated in a glass or quartz container (13) that is equipped with optical windows (14) and a stirring device (15). The lens (11) is optional and depends on the desired laser target width, the concentration of the suspension, and the volume of the suspension, among other factors. For relatively small sample vessels (approx. 10 ml glass vial), the lens, if used, may have a focal length of about 1–5 centimeters. The optical windows must be transparent to the laser radiation wavelength. The stirring device keeps the suspension in motion so that all of the fluid is eventually exposed to the laser radiation. The stirrer also helps keep the particles in suspension. Similarly, while a lens may be used to focus and concentrate the laser beam, similarly, a beam expander may also be used. For the purpose of this invention, the use of a lens or a beam expander or neither is considered to be the decision of the person of skill in the art designing a specific catalyst/support system.

In this embodiment of the invention, a volume of the suspension is irradiated in a fixed volume container. After irradiation for a certain period of time (on the order of seconds to minutes depending on the volume of the container and the desired catalyst particle size), or for a fixed number of laser pulses (tens to thousands depending on the volume of the container and desired catalyst particle size), the colloidal particles have formed again on the substrate (catalyst support) as is desired. Their diameters have been reduced by the laser irradiation process, and they have deposited onto the support. Once the irradiation process is complete, the size and morphology of the deposited particles may be ascertained using a wide variety of analytical techniques. A transmission electron microscope (TEM) has been widely used to obtain particle size distributions of colloidal particles. Specific examples of irradiation of gold and silver particles with a laser are described in McGrath, et al., Laser-Induced Regeneration of Colloidal Particles: The Effects of Thermal Inertia on the Chemical Reactivity of Laser-Heated Particles, Angewandte Chem., Int. Ed. 38, 3353–56 (1999), which is incorporated herein by reference.

An example of the type of laser that could be used is a Q-switched Nd:YAG (Yttrium, Aluminum, Garnet, $Y_3Al_5O_{12}$) manufactured by Spectra Physics. The output wavelength of the laser would depend upon the catalyst being deposited. The laser radiation wavelength would be chosen such that the output wavelength is absorbed by the catalyst, but not by the support. Laser output powers would depend upon the desired size of the catalyst particles being produced. The laser beam may or may not be focused through a lens. A 10 cm focal length high power lens could be used (Oriel Corporation, Stratford, Conn.). The term high power refers to the lens material being able to withstand laser output energies of at least a few hundred mJ per pulse. The lens concentrates the laser's energy into a very small region and thus increases the laser fluence (energy per area), which can be useful to enhance the process of smaller particle formation. The position of the lens would be adjusted until the focal point of the laser intersects the center of the glass or quartz container. A quartz container would be used if the desired output wavelength of the laser is less than 350 nm.

Typical laser pulse energies, repetition rates, and irradiation times that could be used to product smaller particles might range from 10–10,000 mJ or higher, 10–50 Hz, and 1–3600 s, respectively depending on the size and quantity of supported catalyst particles being produced. Of course, the irradiation conditions given here do not encompass the full range of conditions that one might use to produce the desired particle size and quantity of a supported catalyst. The size of the new smaller particles formed would depend on the set of irradiation conditions chosen.

A range of catalyst support materials may be used. Support materials can encompass a wide range of surface areas and pore size distributions. Commonly used supports include titania, alumina, silica-alumina, and zeolites. The choice of support used would depend on the particular catalytic material being deposited. The size of support particles can range from a few microns to a few millimeters in diameter, and surface areas can vary from 1 to 1000 $m^2/g$. For example, zeolites are a well defined class of crystalline aluminosilicate materials that are commonly used in industry to support metal catalysts. They have three-dimensional porous structures that arise from a framework of $SiO_4$ and $AlO_4$ coordinating polyhedral. The surface area of zeolites is typically 800–900 $m^2/g$.

In the second method of producing the catalyst using the apparatus shown in FIG. 1, a laser beam is directed to irradiate a solution containing a catalyst already prepared on a support. The catalyst is deposited on the support by conventional chemical methods, and the dry compound is made into a particulate suspension, again by stirring or the use of ultrasonic or similar mixing devices. The suspension is irradiated as in the previous paragraph. Here, the particles are already deposited onto the substrate, but the laser acts to reduce the diameters of the catalyst particles. The laser acts differentially on the catalyst and the support as it is assumed that the laser radiation is of such a wavelength that it is absorbed by the catalyst, but not by the support.

Figure 2:
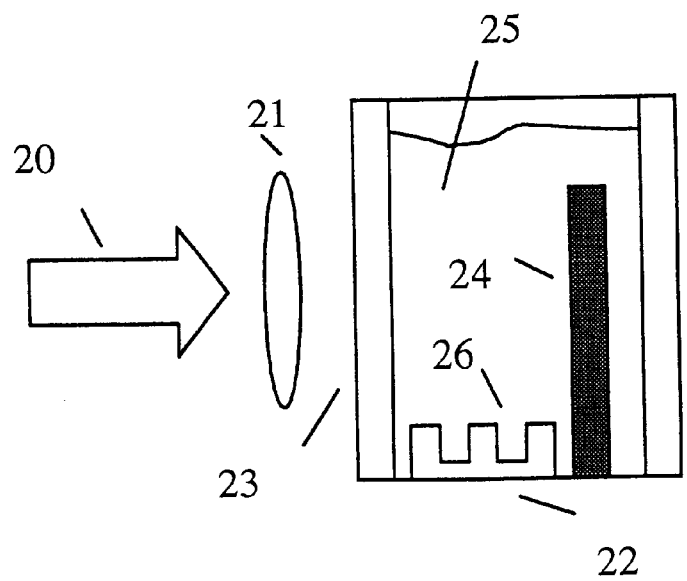

FIG. 2 shows a second embodiment of the invention including a method of synthesis whereby the laser beam (20) that may or may not be focused by a high power lens (21) enters the cell (22) through a window (23) that is transparent to the laser beam and irradiates a piece of bulk catalyst metal foil (24) in the presence of a suspension of particles of the inert substrate (25). The lens increases the laser fluence (energy per area), which can be useful to enhance the process of colloid formation. The position of the lens would be adjusted until the focal point of the laser impacts directly on the surface of the bulk catalyst metal foil. A stirring device (26) keeps the particles suspended and circulates the solution.

The laser irradiates a bulk metal sample (a 1 mm thick foil of the catalyst metal could be used) of the catalyst in the presence of a particulate suspension of the support. The laser acts differentially on the catalyst and the support as it is assumed that the laser radiation is of such a wavelength that it is absorbed by the catalyst, but not by the support. The laser irradiates a bulk metal target in the presence of support particles, which results in the production of ions and particles of the metal which eventually end up as metal bonded to the support or to some extent as colloidal particles in solution. The laser used to irradiate the bulk metal target may be used to produce the final desired catalyst particle size. After irradiation of the bulk metal target in the presence of a particulate suspension of the support to deposit the particles of the catalyst on the support, the bulk metal can be removed and a different laser excitation wavelength may be used to further tailor the size of the deposited catalyst particles.

Figure 3:
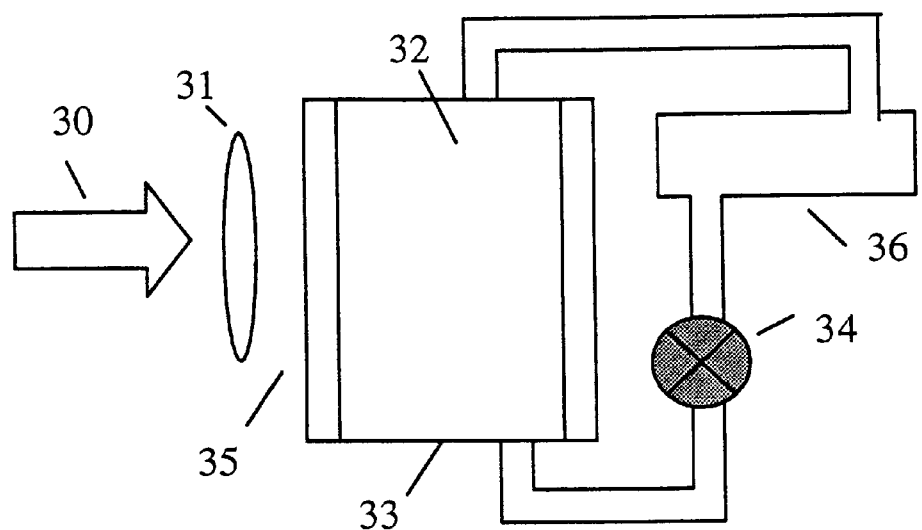

FIG. 3 shows a third embodiment of the invention including a device where a flowing suspension is used so that a large volume of the suspension can be irradiated by the laser over a long period of time. The laser beam (30) that may or may not be focused by a high power lens (31) is directed to irradiate a colloidal suspension of the catalyst material together with particles of the support (32) that is held in a cell (33) equipped with windows (34) that are transparent to the laser wavelength. A pump (35) circulates the suspension between the irradiation cell and a reservoir (36).

As shown in FIG. 3, the laser irradiates flowing suspensions of the colloid and support together. With this setup, a large volume of the suspension can be irradiated by the laser over a long period of time. The laser beam is directed to irradiate a colloid suspension of the catalyst material together with particles of the support. A pump circulates the mixture of catalyst and support as the laser fires. The chemical action is identical to that described in the first embodiment of the device except that the suspension is circulated.

In a second method of producing the catalyst using the apparatus shown in FIG. 3, a laser beam is directed to irradiate a solution containing a catalyst already prepared on a catalyst support. The catalyst is deposited on the support by conventional chemical methods, and the dry compound is made into a particulate suspension, again by stirring or the use of ultrasonic or similar mixing devices. A pump and reservoir have been added to facilitate the production of large quantities of catalyst on a support. The pump circulates the pre-deposited catalyst on the support as the laser fires. The laser acts to reduce the diameters of the catalyst particles. The laser acts differentially on the catalyst and the support as it is assumed that the laser radiation is of such a wavelength that it is absorbed by the catalyst, but not by the support.

Figure 4:
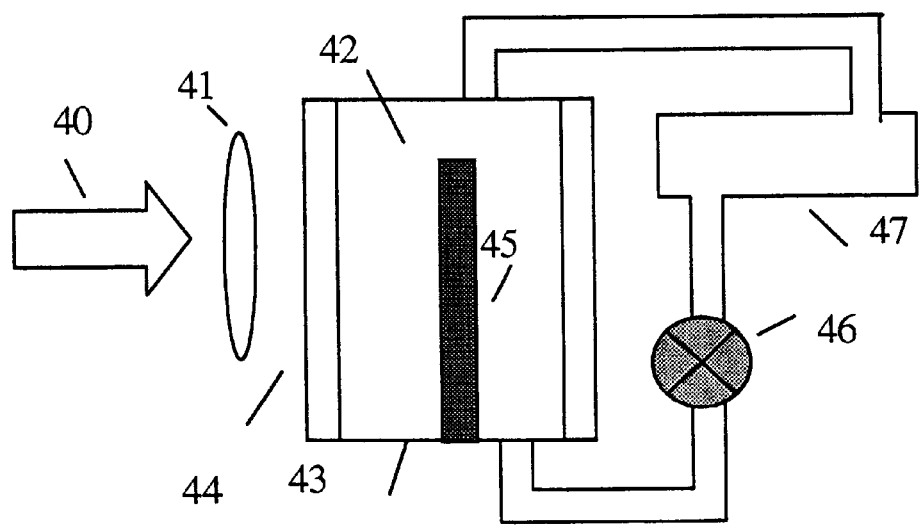

FIG. 4 shows the fourth embodiment of a device where an irradiated target of the catalytic material is in contact with a flowing suspension of particulate support. This configuration is used so that a large volume of the colloid can be synthesized and deposited onto the substrate over a long period of time. The laser beam (40) that may or may not be focused by a high power lens (41) is directed to irradiate a solution (42), of suspended support particles in a cell (43), through a window (44) that is transparent to the laser output wavelength, containing a 1 mm thick bulk metal target of the catalyst material (45). A pump (46) circulates the suspension between the irradiation cell and a reservoir (47).

EXAMPLE

If 1.0 g of a 1.0 weight % silver loaded on alumina was the desired process product, then one could use the following conditions and apparatus. A Nd:YAG laser (Spectra Physics DCR-11), operating with an unfocused, output wavelength of 532 nm and pulse width of 15 ns, could be used to irradiate a mixture of colloidal silver and alumina support particles. A 26 mM colloidal suspension of 80 nm diameter silver particles in water is commercially available from Ted Pella, Inc., Redding, Calif. 5 g of 1–2 μm sized alumina support particles (Aldrich) would be weighted out and added to a 10 ml glass vial. 3.6 ml of the 80 nm diameter silver colloidal suspension would be added to give the right amount of silver necessary to give the desired loading of silver on the support particles. The suspension would be placed in an ultrasonic bath for 2 minutes to facilitate good mixing between the silver and alumina particles. A small magnetic stirrer would be added prior to the irradiation process so that the suspension is continuously stirred. Irradiation of the suspension with the 532 nm unfocused output of a Nd:YAG laser operating at 300 mJ per pulse and at a repetition rate of 10 Hz for 2 min would reduce the size of the particles from 80 nm to less than 20 nm in diameter. Once the irradiation process is complete, the size and morphology of the deposited silver particles would be ascertained using a transmission electron microscope (TEM). The post-irradiated suspension may be dried and it may be activated by reduction or oxidation methods to obtain the desired active state of the deposited silver particles. Silver particles supported on an alpha-alumina support is used in industry to catalyze the production of ethylene oxide.

While the invention has been described with reference to specific embodiments thereof, it will be understood that numerous variations, modifications and additional embodiments are possible, and accordingly, all such variations, modifications, and embodiments are to be regarded as being within the spirit and scope of the invention.

What is claimed:

1. A method of depositing a catalyst onto an inert support wherein a pulsed laser irradiates a suspension containing the catalyst and the support so that the energy from the laser is absorbed by the catalyst and not by the support thereby initiating activity that leads to deposition of the catalyst on the support by the laser.

2. The method of claim 1, further comprising the step of focusing the laser through a high power lens prior to irradiating the suspension.

3. The method of claim 1, wherein the catalyst is comprised of one of the following: silver, platinum, palladium, rhodium, cobalt, iron or nickel and oxides thereof, mixed metal oxides, transition metal oxides, other transition metals, and lanthanide metals and their oxides.

4. The method of claim 1, wherein the support is comprised of one of the following: titania, alumina, silica-alumina or zeolites.

5. The method of claim 1, wherein the laser pulse energy, repetition rate, and irradiation time range from 10–10,000 mJ, 10–50 Hz, and 1–3600 seconds, respectively.

6. A method of reducing the size of catalyst particles already deposited on an inert support wherein a pulsed laser irradiates a suspension containing the catalyst and the support so that the energy from the laser is absorbed by the catalyst and not by the support thereby initiating activity that leads to the production of smaller catalyst particles that are deposited on the support by the laser.

7. The method of claim 6, further comprising the step of focusing the laser through a high power lens prior to irradiating the suspension.

8. The method of claim 6, wherein the catalyst is comprised of one of the following: silver, platinum, palladium, rhodium, cobalt, iron or nickel and oxides thereof, mixed metal oxides, transition metal oxides, other transition metals, and lanthanide metals and their oxides.

9. The method of claim 6, wherein the support is comprised of one of the following: titania, alumina, silica-alumina or zeolites.

10. The method of claim 6, wherein the laser pulse energy, repetition rate, and irradiation time range from 10–10,000 mJ, 10–50 Hz, and 1–3600 seconds, respectively.

11. A method whereby a pulsed laser is directed onto a solid metal target in the presence of an inert support wherein the energy from the laser is absorbed by the metal and not by the support so as to form metal colloidal particles that subsequently are deposited onto the support by the laser.

12. The method of claim 11, further comprising the step of focusing the laser through a high power lens prior to the solid metal target.

13. The method of claim 11, wherein the colloidal metal is comprised of one of the following: silver, platinum, palladium, rhodium, cobalt, iron or nickel and oxides thereof, mixed metal oxides, transition metal oxides, other transition metals, and lanthanide metals and their oxides.

14. The method of claim 11, wherein the support is comprised of one of the following: titania, alumina, silica-alumina or zeolites.

15. The method of claim 11, wherein the laser pulse energy, repetition rate, and irradiation time range from 10–10,000 mJ, 10–50 Hz, and 1–3600 seconds, respectively.

* * * * *